Nov. 10, 1942.   C. I. BRADFORD   2,301,196
ELECTRONIC TUBE CONTROL CIRCUIT
Filed Aug. 30, 1941

INVENTOR
Colin Irving Bradford
BY
ATTORNEYS

Patented Nov. 10, 1942

2,301,196

UNITED STATES PATENT OFFICE 2,301,196

ELECTRONIC TUBE CONTROL CIRCUIT

Colin Irving Bradford, Fairfield, Conn., assignor to Remington Arms Company, Inc., a corporation of Delaware Application August 30, 1941, Serial No. 408,970

7 Claims. (Cl. 161—15)

This invention relates to an apparatus which is responsive to electrical impulses produced in various manners. It will be described particularly in its use in an instrument for measuring time intervals and especially intervals of extremely short duration, although it is to be distinctly understood that it is applicable to other than time measuring instruments, and may for example be applied to apparatus for controlling operations of other devices.

Accurate measurement of time intervals is needed in many precision devices, and as one example thereof, a device for measurement of the flight of a projectile through the barrel of a gun may be cited. Accurate measurements of time intervals are also desired in other instruments such as depth sounding devices, instruments for measuring the operations of relays and circuit breakers, sound locators, and many other operations involving short time intervals from which an electrical impulse can be obtained at the beginning and end of the interval. The invention also may be used for any purpose wherein two impulses are available denoting the beginning or end of the interval, operation or process involved. It is convenient in the measurement of such intervals or the furnishing of an electrical supply to employ a switching circuit utilizing two gaseous discharge tubes similar to that shown generally in applications S. N. 276,167 and S. N. 334,300. In these devices, the grid of one tube is responsive to an impulse at the beginning of the interval and the tube becomes conducting at such time. A second gaseous discharge tube is connected to the circuit of the first tube in a manner as shown in the aforesaid applications, so that when the second tube becomes conducting due to an impulse at the end of the interval, the plate potential of the first tube will be depressed below its conducting point. This will serve to extinguish the first tube. If the device is to be used for measuring time, the time interval during which the first tube remains conducting may be measured in various ways. If the impulses are to be used to control an operation or process, various means can be employed utilizing the flow through the first tube. The extinguishment of the first tube may be by the use of the discharge of a condenser through the second tube or a battery through the second tube to cause the depression of the plate potential of the first tube, as disclosed in the aforesaid applications. By the present invention, another means has been found for extinguishing the first tube when the second tube becomes conducting.

The invention will be described particularly as related to a chronoscope for measuring the flight of a projectile, but it is to be understood that it may be used for other equivalent purposes. A further example may be the control of a welding operation wherein a relay or large gaseous tube associated with the first tube circuit may become energized with said tube at the first impulse and deenergized at the second impulse. It is evident, however, that this is merely an example, and that many other processes can be controlled, such as air conditioning devices or any place where an electric motor is involved.

In the measurement of the flight of projectiles for velocities over short ranges and for barrel time and times between .002 and .040 second, the conventional Boulenge chronograph is not satisfactory. One of the objects of this invention is to provide an accurate instrument for measurement of short time intervals which is an improvement over the previous devices. Another object is the supply of a source of energy between the receipt of two electrical impulses to control processes and operations. From the following illustrative description in which are disclosed certain embodiments of the invention as well as the means and details of carrying it out, it will become apparent how the foregoing and other objects may be accomplished.

The switching circuit for the chronoscope disclosed herein is responsive to an impulse at the beginning of the interval and at the end of the interval, and serves to provide a flow of current during the interval to be measured. In the particular embodiment shown in Fig. 2, a ballistic galvanometer is used as the indicating instrument. The plates or anodes of two gaseous discharge tubes are connected together, as are also the cathodes. There is a common connection between the anode connection just referred to and the cathode connection with a source of energy and a resistance in said common connection.

Figure 1:
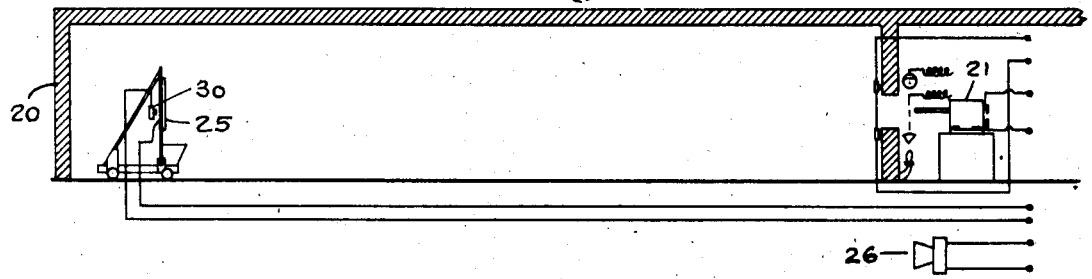
Fig. 1 is a schematic drawing of a ballistic range which shows several devices for indicating the time at which a projectile arrives at a particular point of its flight.
Figure 2:
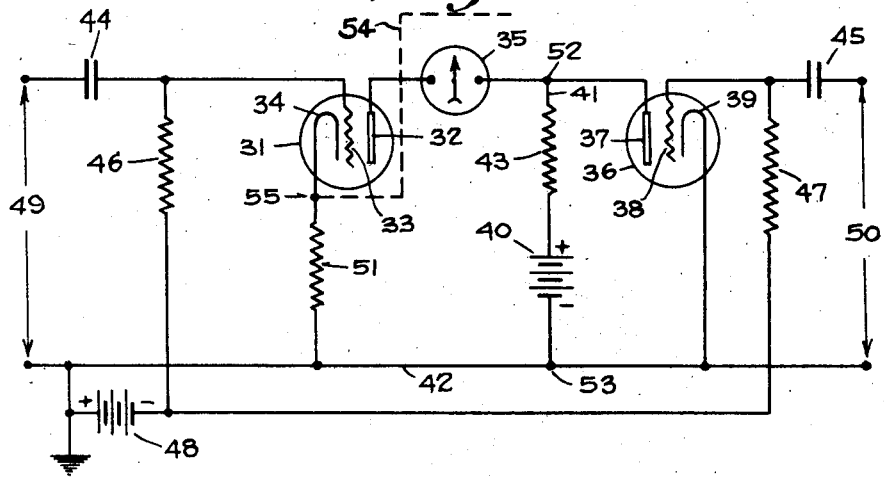
Fig. 2 is a simplified circuit arrangement of one form of the invention.

Referring now specifically to Fig. 1, there is shown merely by way of example one manner of using the invention, wherein 20 indicates the walls and roof of a ballistic range. In the firing chamber, there may be located a breech mechanism 21 which may be fastened in any suitable manner, and at the other end of the range there is located a target plate 25 against which a projectile fired from the barrel may be directed. There may be a disjunctor contact 30 of conventional design located back of the target plate. There may also be provided some suitable means at the muzzle of the gun or responsive to the fall of the hammer upon the primer of the projectile to provide a suitable impulse to indicate the starting of the projectile in its flight. A bullet striking target plate 25 will cause the cantact 30 mounted thereon to be moved away from plate 25, thereby breaking the contact and causing an impulse. The impulses thus created may be used to indicate the beginning and end of the interval. The details of the ballistic range are well-known and are not a part of this invention. It is evident that many various forms and devices may be used to provide the impulses to indicate the beginning and end of the interval to be measured, such as, for example, the microphone indicated at 26. Such impulses may cause the making or the breaking of a circuit to affect the control grid of the first tube. For the purposes of illustrating the invention, a switching circuit is shown in Fig. 2, wherein a ballistic galvanometer is used to give an indication of the time interval.

The general equations for the ballistic galvanometer are:

$$\theta = kQ$$

wherein $k$ indicates the constants of the instrument, $\theta$ indicates the deflection, and $Q$ the quantity of a current passing through the instrument. The current $I$ flows through the galvanometer during the interval to be measured and $Q$ equals $IT$, so therefore the galvanometer deflection will be $$\theta = kIT$$

and then if $k$ and $I$ are known, $$T = \frac{\theta}{kI}$$

Constant $k$ and the current $I$ can be readily determined, as set forth in the co-pending applications just referred to, and for the purpose of the present invention, it is not deemed necessary to further describe the method for so doing.

The flow of current in the plate circuit of the first tube may also, for example, be used to operate a meter similar to that disclosed in co-pending application, S. N. 408,969, wherein a vacuum tube is energized when current is flowing in the circuit of the first tube. The plate circuit of the said tube includes a condenser, the charge on which may be measured. It is also evident that other methods may be used for measuring or recording the passage of current during the time interval in the first mentioned tube, the main criterion being that the current be kept constant in said tube circuit or in the device that is used to measure the interval, such as the condenser. The constancy of the current will govern the accuracy. If a control relay is operated, the requirements of constant current may be relaxed. A circuit is shown diagrammatically in Fig. 3 wherein a vacuum tube is provided which is responsive to the flow in the first tube of the switching circuit. A condenser is in the vacuum tube circuit and an electron tube voltmeter is provided for measuring the charge on the condenser if the device is used for measuring intervals.

Referring now particularly to Fig. 2, a gaseous discharge tube 31 has an anode or plate 32, control grid 33 and cathode 34. It is to be understood in this application wherever the word "plate" or "grid" is used, that this may also mean "anode" or "control element" respectively. The ballistic galvanometer 35 is located in the plate circuit of tube 31. A second gaseous discharge tube 36 has an anode 37, control grid 38 and cathode 39. A source of energy 40 is located in the common connection 41 between the lead connecting plates 32 and 37 of the two tubes and lead 42 connecting the cathodes 34 and 39 of the two tubes. There is a resistance 43 also located in this common connection. Conventional condensers 44 and 45 and biasing resistances 46 and 47 may be provided, battery 48 giving the negative bias for tubes 31 and 38. After the tube 31 has been rendered conducting by means of an impulse placed across terminals 49, the plate circuit from plate 32, cathode 34, lead 42, battery 40, resistance 43 and ballistic galvanometer 35 has a current passing therethrough. At the end of the interval, an impulse may be placed upon terminals 50, which will cause the normally non-conducting tube 36 to commence conduction. It is desired to have the starting of conduction of tube 36 serve to stop conduction in tube 31 by reducing the anode potential thereof below the critical value at which the tube will remain conducting. This value is approximately fifteen (15) volts for the "Thyratron" tube of conventional type. In order to depress the plate potential to this point, an extinguishing resistance 51 is provided in the cathode circuit of tube 31. When this extinguishing resistance is in the circuit and tube 36 becomes conducting, the plate potential on tube 31 will be reduced so that conduction will be stopped in tube 31. The ballistic galvanometer will then read directly the quantity of current passing therethrough, which will in turn be directly proportional to the time interval being measured. This simple manner of extinguishing the gaseous discharge tube in place of using a condenser or a battery in the plate-cathode circuit of tube 36 may be demonstrated, for example, mathematically by the following equations:

$$E_{AK_{31}} = E_{40} - IR_{43} - IR_{51}$$

$$E_{AK_{36}} = E_{40} - IR_{43}$$

Then, at the time of conduction, the potential across tube 36 or $E_{36}$ must equal the potential across tube 31 plus resistance 51. As these tubes are connected across points 52 and 53 so that at the instant tube 36 fires, and because the two tubes are the same type, $$E_{40} - IR_{43} - IR_{51} = E_{40} - IR_{43}$$

or $$IR_{51} = 0$$

so that no current will pass through 51 and tube 31 will be extinguished at the time tube $E_{36}$ becomes conducting. In the above, $E_{AK_{31}}$ equals the potential drop from the anode to cathode of tube 31; $E_{AK_{36}}$ is the potential drop between anode and cathode of tube 36; $IR_{43}$ is the drop across resistance 43; and $IR_{51}$ is the potential drop across resistance 51.

This may also be shown mathematically by the following:

(1) $E_{AK_{31C}} = E_{40} - IR_{43} - IR_{51}$ wherein $E_{AK_{31C}}$ is the potential drop between the anode and cathode of tube 31 while it is conducting. Therefore, when tube 31 is conducting, the potential between anode and cathode will be the potential of the battery less the drop in resistance 43 and the drop in resistance 51. Transposing in this equation, we will get:

(2) $E_{AK_{31C}} + IR_{51} = E_{40} - IR_{43}$ which also may be interpreted as meaning that the potential drop impressed between anode 32 and point 53 will be equal to that at points 52 and 53. Then, at the instant tube 36 becomes conducting, the following relation will occur:

(3) $E_{AK_{36C}} = E_{40} - IR_{43}$ which will be the potential across the common connection between points 52 and 53. Then Equations 2 and 3 may be combined, as it is seen that the right hand factor of Equation 2 is the same as Equation 3, so at the instant tube 36 becomes conducting (4) $E_{AK_{31C}} + IR_{51} = E_{AK_{36C}}$ but the drop in the tubes must be equal, so (5) $E_{AK_{31C}} = E_{AK_{36C}}$ Therefore, from (4) and (5), $IR_{51}$ must equal zero.

Thus the voltage available for circulating current through tube 36 will be the drop across resistance 51 or $IR_{51}$ or will be $E_{40} - IR_{43}$, but the path will be through resistance 43 when tube 36 becomes conducting so the current through tube 36 will be $$\frac{IR_{51}}{R_{43}}$$

because $$I = \frac{E}{R}$$

The potential of point 52 or plate 32 will be depressed as a result of the additional current flow through $R_{43}$ due to conduction of tube 36, and will be depressed by $$\left(\frac{IR_{51}}{R_{43}}\right) R_{43}$$

and then (6) $E_{AK_{31X}} = E_{40} - IR_{43} - IR_{51} - \frac{IR_{51}}{R_{43}} R_{43}$ wherein $E_{AK_{31X}}$ represents the potential drop between the anode and cathode of tube 31 at the time of extinction. In the right-hand member of this equation, $R_{43}$ will cancel out so that the extinction voltage will be $E_{51}$ or $IR_{51}$. It has been determined that this extinction voltage must be at least equal to the internal drop in tube 31, and experimentally it has been found that if such is greater than twelve (12) volts, depending upon the particular tube used, the circuit will function properly. It can be seen therefore from the above description that after tube 31 has become conducting, galvanometer 35 will be given an impulse which will be proportional to the time tube 31 stays conducting. When tube 36 receives the impulse at the end of the interval, the current flow therethrough will cause the potential drop across resistance 51 to depress the plate potential on tube 31 an amount sufficient to render this tube non-conducting, thus stopping the current flow through galvanometer 35.

Figure 3:
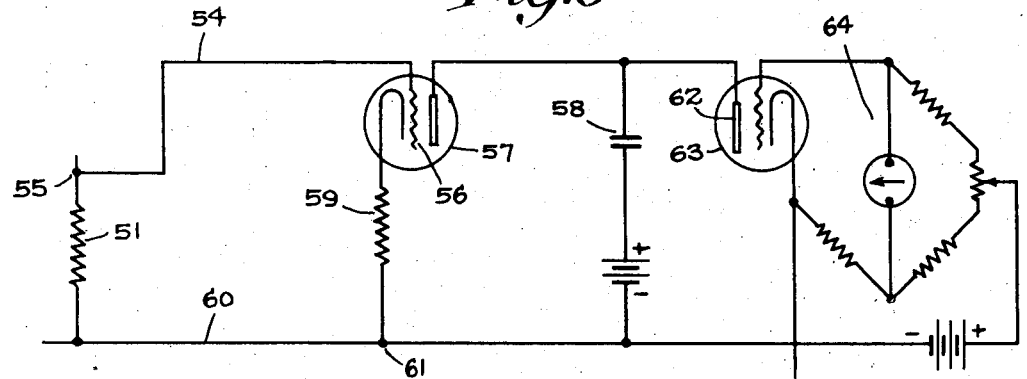
Fig. 3 is a fragmentary simplified circuit diagram of a measuring means which may be applied to Fig. 2.

In Fig. 3 is shown still another form of the device wherein the flow of current, instead of operating the galvanometer, may be used to operate a vacuum tube circuit having a compensating resistance and condenser. The charge on the condenser may then be read, if desired, on a vacuum tube voltmeter. This type of circuit is generally shown in application, S. N. 408,969. In general, the lead 54 (shown in dotted lines in Fig. 2) is connected to point 55 of Fig. 2, and this allows the potential existent at point 55 to be impressed upon a grid 56 of tube 57. This will start conduction in tube 57, which will cause the current to flow through condenser 58, charging the same. Compensating resistance 59 is connected through lead 60 and resistance 51 to point 55 from where the potential developed at point 61 will be impressed upon control grid 56 so as to compensate for changes in current flow in the plate circuit of tube 57 as the charge is accumulated on the condenser. Then the charge accumulated on the condenser may be impressed upon the control element 62 of the inverted vacuum voltmeter tube 63, which may be located in a suitable bridge circuit, as described in said co-pending application, S. N. 408,969.

It is obvious that there are other methods of measuring a time interval, and the present invention is not limited to that shown. By the simple expedient shown herein, namely the use of a cathode resistance of sufficient value so that the voltage drop therethrough is twelve (12) volts or more, the tube receiving the first impulse in the chronoscope switching circuit may be extinguished without the use of a battery or condenser.

Figure 4:
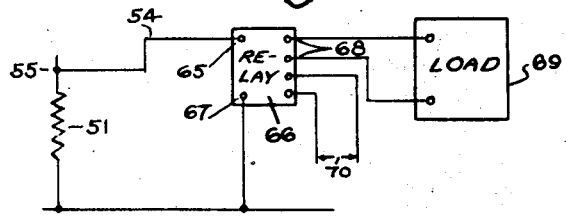
Fig. 4 is a diagrammatic view illustrating another use of the invention.

In Fig. 4 is shown fragmentarily one manner in which to use the invention to control a process. 54 is the lead connected to point 55 of Fig. 2. This may be connected to terminal 65 of a relay 66. The other terminal 67 of the relay may be connected to the ground lead 42. Terminals 68 may be the power take-off from the relay 66 to control the operation of the apparatus at 69. Leads 70 represent the power input to the relay 66 for the load. It is to be understood that relay 66 may be of any desired type, such as mechanical or electronic, and that load 69 may be any type of apparatus to be controlled, such as, for example, a welding device or an electric motor. When the device is used for control, the requirement of constant current is not as rigid, as it is merely necessary that the relay or electronic tube relay 66 remain energized.

The invention is not to be construed as limited to the illustrations and description, but is to be extended to all equivalent devices coming within the scope of the appended claims.

What is claimed is:

1. In an impulse responsive device, two normally non-conducting gaseous discharge tubes including plates, cathodes and control elements, a connection between said plates, a connection between said cathodes; a common source of energy for said tubes and a resistance in series with said source; an extinguishing resistance connected in series with the cathode of one tube, said last mentioned tube becoming conducting when an impulse is placed on the control element thereof, said other tube becoming conducting when an impulse is placed on the control element thereof, the value of the extinguishing resistance being such that when the second tube becomes conducting the potential drop across said first mentioned resistance will extinguish the first tube.

2. In an impulse responsive device, a circuit including two normally non-conducting gaseous discharge tubes having plates, cathodes and control elements, a connection between said plates, a connection between said cathodes; a common source of energy for said tubes and a resistance in series with said source; an extinguishing resistance in series with the cathode of one tube, said last-mentioned tube being rendered conducting when a first impulse is placed on the control element thereof, said other tube becoming conducting when an impulse is placed on the control element thereof, the value of the extinguishing resistance being such that when the second tube becomes conducting the first tube is rendered again non-conducting; and apparatus operable by the flow of electricity through the first tube.

3. In an impulse responsive device, a circuit including two normally non-conducting gaseous discharge tubes having plates, cathodes and control elements, a connection between said plates, a connection between said cathodes; a common source of energy for said tubes and a resistance in series with said source; an extinguishing resistance in series with the cathode of one tube, said last mentioned tube becoming conducting when a first impulse is placed on the control element thereof, said other tube becoming conducting when an impulse is placed on the control element thereof, the flow of current through the first mentioned resistance when the second tube becomes conducting being such as to depress the plate potential of the first tube so as to render said tube again non-conducting; and apparatus operable by the flow of electricity from the common source of energy to the plate and cathode of said first tube.

4. In an impulse responsive device, a circuit including two normally non-conducting gaseous discharge tubes having plates, cathodes and control elements, a connection between said plates, a connection between said cathodes; a common source of energy for said tubes and a resistance in series with said source; an extinguishing resistance in series with the cathode of one tube, said last mentioned tube being rendered conducting by a first impulse placed on the control element thereof, said other tube becoming conducting when an impulse is placed on a control element thereof whereby the first tube is rendered again non-conducting; relay means responsive to the flow of electricity through the first tube; and load means connected to said relay and operable when said relay is energized by the flow through the first tube.

5. In an interval measuring device, a circuit responsive to a change in condition at the beginning and end of the interval to be measured including two normally non-conducting gaseous discharge tubes having plates, cathodes and control elements, a connection between said plates, a connection between said cathodes; a common source of energy for said tubes and a resistance in series with said source; an extinguishing resistance in series with the cathode of a first of said tubes, said first tube being rendered conducting at the beginning of the interval when a change in condition changes the potential of a control element of said first tube, said other tube becoming conducting at the end of the interval due to a change in condition changing the potential of a control element of the second tube, the flow of current through the first mentioned resistance when the second tube becomes conducting being such as to depress the plate potential of the first tube so as to render said tube again non-conducting; and means to measure the quantity of electricity flowing from the common source of energy through the plate and cathode of said first tube.

6. In an interval measuring device, a circuit responsive to a change in condition at the beginning and end of the interval to be measured including two normally non-conducting gaseous discharge tubes having plates, cathodes, control elements and circuits therefor, a connection between said plates, a ballistic galvanometer in the plate-cathode circuit of the first of said tubes, a connection between said cathodes; a common source of energy for said tubes including a resistance in series with said source; an extinguishing resistance in series with the cathode of said first tube, said first tube being rendered conducting at the beginning of the interval due to a change in condition changing the potential of a control element thereof, said other tube becoming conducting at the end of the interval due to a change in condition changing the potential of a control element thereof whereby the first tube is again rendered non-conducting by the potential drop on its plate, said galvanometer measuring the quantity of electricity flowing through the first tube.

7. In an interval measuring device, a circuit responsive to a change in condition at the beginning and end of the interval to be measured including two normally non-conducting gaseous discharge tubes having plates, cathodes and control elements, a connection between said plates, a connection between said cathodes; a common source of energy and a resistance in series with said source, said source and resistance being connected between the said plate connection and said cathode connection; an extinguishing resistance in series with the cathode of one tube, said last mentioned tube being rendered conducting at the beginning of the interval due to the impression of said change in condition at the beginning of the interval upon a control element thereof, said other tube becoming conducting at the end of the interval due to the impression of said change in condition at the end of the interval upon a control element thereof, whereby the first tube is rendered again non-conducting; and means to measure the quantity of electricity flowing through the first tube.

COLIN IRVING BRADFORD.